United States Patent
Fukasawa et al.

(10) Patent No.: US 7,445,760 B2
(45) Date of Patent: Nov. 4, 2008

(54) METHOD OF REPROCESSING SPENT NUCLEAR FUEL

(75) Inventors: Tetsuo Fukasawa, Hitachi (JP); Masanori Takahashi, Mito (JP); Youji Shibata, Hitachinaka (JP); Akira Sasahira, Hitachi (JP); Mamoru Kamoshida, Hitachi (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 0 days.

(21) Appl. No.: 09/947,544

(22) Filed: Sep. 7, 2001

(65) Prior Publication Data

US 2002/0122762 A1  Sep. 5, 2002

(30) Foreign Application Priority Data

Mar. 2, 2001 (JP) .............................. 2001-057564

(51) Int. Cl.
  *C22B 60/00* (2006.01)
(52) U.S. Cl. ................... 423/8; 423/9; 423/10
(58) Field of Classification Search ............. 423/8, 423/9, 10; 976/DIG. 279
  See application file for complete search history.

(56) References Cited

U.S. PATENT DOCUMENTS

| | | | |
|---|---|---|---|
| 2,830,873 A | | 4/1958 | Katz et al. |
| 3,275,422 A | | 9/1966 | Cathers et al. |
| 3,294,493 A | | 12/1966 | Jonke et al. |
| 3,359,078 A | | 12/1967 | Alter et al. |
| 4,011,296 A | * | 3/1977 | Ruiz et al. .............. 423/10 |
| 4,278,559 A | | 7/1981 | Levenson et al. |

FOREIGN PATENT DOCUMENTS

| | | |
|---|---|---|
| GB | 925178 | 5/1963 |
| GB | 1129855 | 10/1968 |
| JP | 09138297 | 5/1997 |

OTHER PUBLICATIONS

"Purification Process studies for the Reprocessing by Fluoride Volatility Method", JAERI-M6592, pp. 1-44, Japan Atomic Energy, Research Institute, 1976, no month.

"Present Status and Problems on Non-Aqueous Reprocessing" by Special Committee on Non-aqueous Reprocessing, Journal of the Atomic Energy Society of Japan, vol. 9, No. 9, pp. 14-19 (1967), no month.

"Safeguards and Nonproliferation Aspects of a Dry Fuel Recycling Technology", 1993, vol. 2, pp. 715-721, no month.

* cited by examiner

*Primary Examiner*—Steven Bos
(74) *Attorney, Agent, or Firm*—Crowell & Moring LLP

(57) ABSTRACT

Most part of an amount of uranium contained in the spent nuclear fuel is removed by making fluorine or a fluorochemical act on the spent nuclear fuel to convert the uranium into $UF_6$, and the uranium is purified through a simple method of distilling the $UF_6$ together with a absorbent. After removing the most part of the amount of uranium, the remaining nuclear fuel material is dissolved and then transferred to an extraction process to recover plutonium. By doing so, a small sized dry process can be employed as a uranium purification process. Since the nuclear fuel material is dissolved and extracted after removing most part of an amount of uranium, a volume of processing solution can be reduced and the machine installation scale can be made small. Accordingly, the reprocessing facility can be extremely downsized.

7 Claims, 5 Drawing Sheets

METHOD OF REPROCESSING SPENT NUCLEAR FUEL

BACKGROUND OF THE INVENTION

The present invention relates to a method of reprocessing spent nuclear fuel.

A reprocessing technology practiced at present is the Purex method. The Purex method is that spent nuclear fuel containing uranium and plutonium is dissolved into nitric acid, and the nitric acid solution is in contact with an organic phase which is prepared by diluting an extracting agent of TBP (tributyl phosphate) with dodecane to separate and purify uranium and plutonium utilizing a property of uranium and plutonium moving to the organic phase more easily than most of fission products. The outline of the Purex method is described, for example, in Japanese Patent Application Laid-Open No.9-138297. In the method described in this patent gazette, spent nuclear fuel is dissolved in nitric acid, and then the solution is transferred to a process called as a co-decontamination process, and there, uranium and plutonium are extracted together using the organic solution of diluting TBP with dodecane. The co-extract of organic solution containing uranium and plutonium is transferred to a process called as a distribution process. On the other hand, the fission products are remain in the nitric acid solution which has initially contained the uranium and the plutonium is processed as a high radioactive liquid waste. In the distribution process, the nitric acid solution phase is in contact with the organic solution containing uranium and plutonium, and plutonium is inversely extracted to the nitric acid solution phase by being reduced to trivalent plutonium. Since at that time, uranium remains in the organic phase, uranium and plutonium are separated from each other. The uranium and the plutonium separated from each other in the distribution process are transferred to individual purification processes, and the purified plutonium and the purified uranium obtained through the individual purification processes are to be reused as nuclear fuel.

Japanese Patent Application Laid-Open No.9-138297describes a method in which the Purex reprocessing process is simplified to about 20% of the conventional processes to improve the economic feature, and the liquid waste produced from the processing facility is reduced to a very small amount. This second method derives two inventions from the facts that the reactor core fuel used for a fast breeder reactor requires not so high purity in the uranium and plutonium, and that the blanket fuel used for the fast breeder reactor does not require so high purity in the uranium. The first invention is that the distribution process is eliminated by extracting uranium and plutonium in a ratio suitable for the core fuel of the fast breeder reactor in the inverse extraction process, and that the purification process and the related processes and reagents are eliminated by allowing decreasing of a purity degree index of DF (decontamination factor: a value of a ratio of a radioactivity concentration after processing to a radioactivity concentration before processing). This invention is called as a single cycle method because the reprocessing extraction process comprises only the co-decontamination process. The second invention is that a process called as a crystallization process is provided before the co-decontamination process. In the co-decontamination process, the nitric acid solution having dissolved spent nuclear fuel is cooled to separate part of the amount of uranium through re-crystallization. The extraction process and the inverse extraction process can be made compact because an amount of nuclear fuel material to be processed in the co-decontamination process and in the inverse extraction process can be reduced by removing the excessive uranium by the separation, and because the plutonium and the uranium in the mixed ratio for the core fuel can be easily inverse-extracted in the inverse extraction process. In the crystallization process, the excessive uranium is separated as uranium nitrate. The uranium nitrate can be denitrated and roasting-reduced without being purified to be used as the blanket nuclear fuel for the fast breeder reactor.

The two inventions disclosed in Japanese Patent Application Laid-Open No.9-138297 are effective in the case where the recovered uranium and plutonium is used for the fast breeder reactor fuel. However, the uranium and plutonium obtained through reprocessing is also used in light water reactors in addition to the fast breeder reactors. In order to use the recovered plutonium in an exiting light water reactor, the radioactivity of the fuel must be sufficiently low. This problem can be relatively easily solved by restoring the eliminated purification process in the first invention disclosed in Japanese Patent Application Laid-Open No.9-138297. If the extraction process and the inverse extraction process are made compact by the second invention of Japanese Patent Application Laid-Open No.9-138297, the purification process can be made smaller than that in the conventional Purex method. Therefore, plutonium having a DF nearly equal to a DF in the conventional method can be recovered using a very small reprocessing facility, even restoring the purification process, compared to the conventional method.

Another problem relates to use of recovered uranium in the light water reactor. The recovered uranium contains about 1% of U-235, and the U-235 concentration must be enriched up to about 4% in order to reuse the recovered uranium in the light water reactor. The uranium oxide obtained from the reprocessing facility has been converted to a chemical form of volatile $UF_6$, and then the concentration of U-235is increased (enrichment of U-235is performed) through a centrifugal separation method or the like. In order to perform these processes, about 10millions of DF is required. In order to purify the uranium separated in the crystallization process, an equipment having nearly the same size of the equipment for the co-decontamination and purification processes in the original Purex method. Accordingly, there is a problem in that the effect of downsizing the reprocessing facility by separation in the crystallization process is canceled.

SUMMARY OF THE INVENTION

An object of the present invention is to provide a method of reprocessing spent nuclear fuel which can increase the decontamination factor and can downsize the reprocessing facility.

The above object can be attained by using a method of making fluorine or a fluorochemical act on spent nuclear fuel as a method of removing part of an amount of uranium contained in the spent nuclear fuel.

A method of making fluorine or a fluorochemical act on spent nuclear fuel is known as a fluoride volatilization method. A fluoride volatilization method is described, for example, in a paper "JAERI-M6592 (1976)". In this method, spent nuclear fuel is pulverized, and supplied to a process called as a fluorination process. When the powder is put under a comparatively mild reacting condition, uranium contained in the spent nuclear fuel is converted to $UF_6$ to be volatilized, but low reactivity plutonium is hardly volatilized. Using this method, part of an amount of uranium can be separated from the spent nuclear fuel. In the general fluoride volatilization method, plutonium is also recovered by changing the condition to volatilize plutonium after removing a certain amount of uranium. However, in the present invention, this fluorination recovery of uranium is not performed because it is sufficient to separate part of an amount of uranium from the spent nuclear fuel. The spent nuclear fuel after removing part of an amount of uranium is dissolved in nitric acid, and purified through the conventional Purex method or the single cycle method or a method of adding a purification process to the single cycle method, and then converted to nuclear fuel containing plutonium.

An advantage of the fluoride volatilization method is that purification can be simply performed by distilling the separated $UF_6$ together with a absorbent such as NaF. According to an article entitled "The Present Status of Dry Reprocessing and its Problems" by the Dry Reprocessing Research Specialist Committee, Journal of the Japan Society of Atomic Energy, Vol.9, No.9, p530-p535(1967), the DF reaches 100millions to 1billion. Therefore, the problem of compactly performing uranium purification can be solved.

The uranium purified as described above can be directly applied to an enrichment process in order to increase the enrichment of U-235because it is in a chemical form of $UF_6$. Therefore, since the processes of denitration of uranium nitrate, roasting-and-reduction and conversion to $UF_6$ can be eliminated in a series of processes relating to reusing to the light water reactor, the fluoride volatilization method has an effect of making the reprocessing facility more compact than the conventional method.

In the crystallization method, after once dissolving the spent nuclear fuel to nitric acid, part of an amount of uranium in the spent nuclear fuel is removed. Therefore, a volume of the dissolving liquid is not different from that in the Purex method. On the other hand, in the fluoride volatilization method, part of an amount of uranium is removed, and then the residue is dissolved. Therefore, in the fluoride volatilization method, a volume of the nitric acid solution used for dissolving is small, and accordingly a volume of the processing solution used in the following process of the conventional Purex method or the single cycle method or the method of adding the purification process to the single cycle method becomes small.

One of major differences between the Purex method and the single cycle method is in whether or not the method has a distribution process for separating uranium from plutonium. Since the concentration of plutonium in nuclear fuel containing plutonium is higher than that in the spent light water fuel, the distribution process for extracting plutonium is necessary. In the present method which separates uranium by fluorinating spent nuclear fuel before dissolving the spent nuclear fuel, the ratio of plutonium to uranium can be adjusted in advance. Therefore, the distribution process can be eliminated, and accordingly it is possible to use a compact equipment of the single cycle method or the method of adding the purification process to the single cycle method.

As described above, there are effects in (1) that since the DF of separated $UF_6$ can be made above 10millions by removing part of an amount of uranium contained in the spent nuclear fuel by making fluorine or a fluorochemical act on the spent nuclear fuel, the simple method of distillation together with an absorbent such as NaF can be employed, and accordingly the equipment for the purification process can be downsized, and (2) that since the denitration process and the roasting-and-reduction process of uranium nitrate and the process of converting to $UF_6$ can be eliminated in a case of reusing spent nuclear fuel in the light water reactor, the facility can be made more compact compared to the facility of the conventional method, and (3) that the single cycle method or the process of adding the purification process to the single cycle method without the distribution process can be employed, and (4) that since the spent nuclear fuel is transferred to the extraction process after removing part of an amount of uranium, the volume of nitric acid used for dissolution and the size of the dissolving apparatus and the volume of the processing solution and the size of the equipment used in the following process of the conventional Purex method or the single cycle method or the method of adding the purification process to the single cycle method can be made small and accordingly the reprocessing facility can be substantially downsized.

DETAILED DESCRIPTION OF THE EMBODIMENT

Embodiment 1

Figure 1:
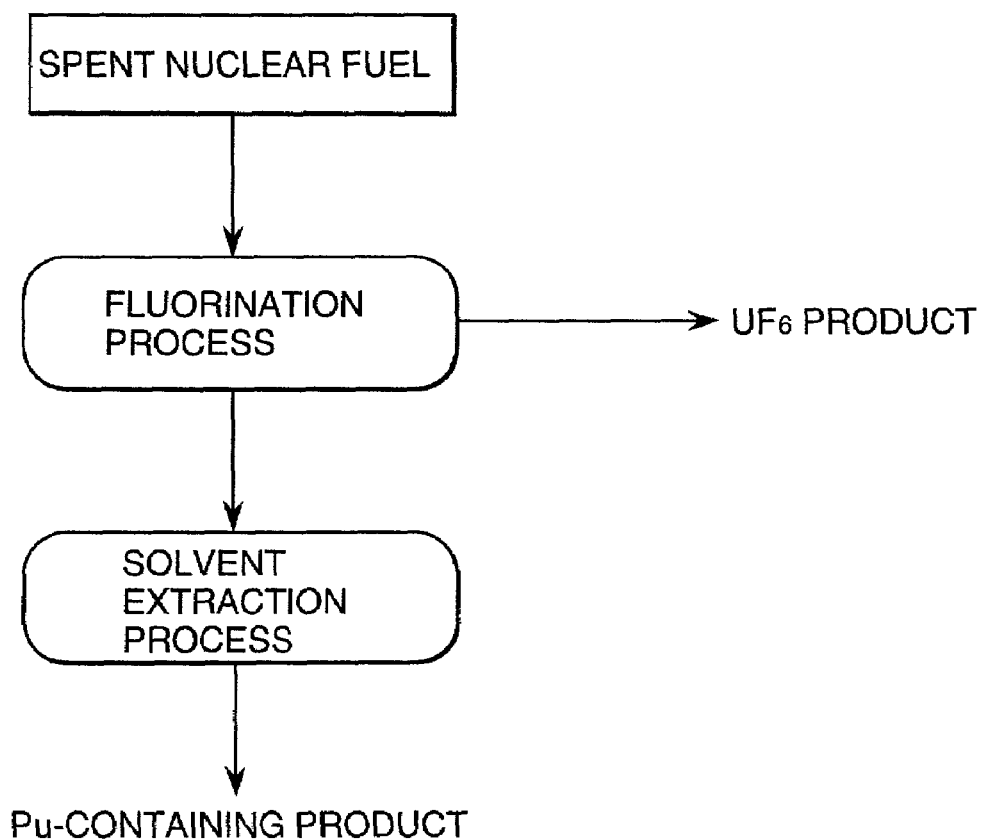
FIG. 1 is a diagram showing a basic embodiment in accordance with the present invention.

A basic embodiment of a method of reprocessing spent nuclear fuel in accordance with the present invention will be described, referring to FIG. 1. The structure of FIG. 1 is composed of a fluorination process an a solvent extraction process. In the fluorination process, initially, fluorine or a fluorochemical is made to act on a spent nuclear fuel or a nuclear fuel material extracted from the spent nuclear fuel. At that time, the uranium reacts with fluorine to be converted into volatile $UF_6$. After volatilizing and removing part of or most part of an amount of uranium, the remaining uranium, plutonium and the other nuclides are sent out to a solvent extraction process. In the solvent extraction process, solvent extraction processing of the received mixture of uranium, plutonium and the other nuclides is performed to remove most of the other nuclides from the mixture. Then, the mixture containing plutonium is sent out as a product.

According to the present embodiment, since an amount of the material to be processed in the extraction process is reduced by removing part of an amount of uranium contained in the spent nuclear fuel by making fluorine or a fluorochemical act on the spent nuclear fuel, a volume of the processing solution and the size of the equipment can be decreased, and accordingly there is an effect in that the reprocessing facility can be made substantially small.

Embodiment 2

Figure 2:
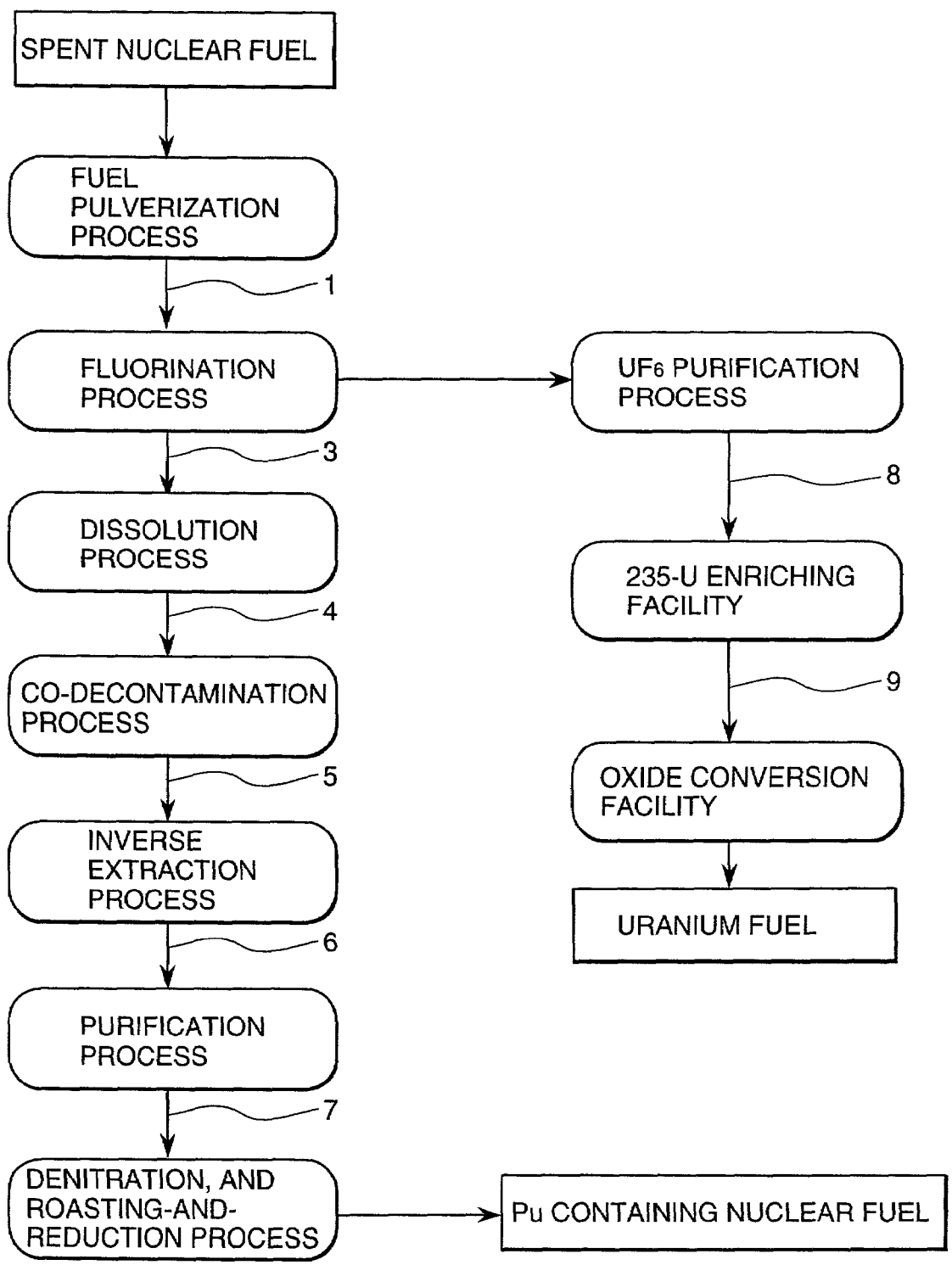
FIG. 2 is a diagram showing a preferable embodiment of processing of a method of reprocessing spent nuclear fuel in accordance with the present invention.

An embodiment of a method of reprocessing spent nuclear fuel in accordance with the present invention will be described below, referring to FIG. 2. FIG. 2 shows an example in which a process of adding a purification process to a single cycle method is linked with the fluorination process for separating part of an amount of uranium. The reprocessing method of this structure is composed of a fuel pulverization process, a fluorination process, a dissolution process, a co-decontamination process, an inverse extraction process, a purification process, a denitration/roasting-and-reduction process, and a $UF_6$ purification process. Further, a facility for enriching U-235 of the obtained purified $UF_6$ and a facility for converting the product to the oxide and fabricating fuel are additionally illustrated though these facilities do not belong to the reprocessing facility.

The spent nuclear fuel is converted to powder in the fuel pulverization process to which an oxidation-reduction decladding method known as an OREOX method [PROC. GLOBAL '93 Vol.2, p715 (1993)] can be applied. The pulverized fuel 1 is sent to the fluorination process, and part of an amount of uranium is converted to $UF_6$ by fluorine or a fluorochemical to be volatilized. In the UF6 purification process, the volatilized uranium hexafluoride 2 is separated from volatile fission products and a small amount of entrained plutonium to be purified up to a DF above 10 millions. A distillation method or an absorption method may be used for the purification process. On the other hand, the remaining nuclear material 3 not volatilized in the fluorization process includes uranium, plutonium and fission products. This residue is transferred to the dissolution process to be dissolved in nitric acid. The dissolution process may include a process for converting the residue into an easily-dissoluble chemical form, for example, an oxide. The dissolution liquid 4 is transferred to the co-decontamination process. In the co-decontamination process, dissolution liquid is brought in contact with an organic phase as an extractor, for example, TBP to move the uranium and the plutonium to the organic phase. Since most of the fission products are difficult to move to the organic phase, the uranium and the plutonium are purified. The organic phase 5 is transferred to the inverse extraction process. In the inverse process, the uranium and the plutonium are moved to an aqueous phase using a thin nitric acid solution. Materials easy to move the organic phase among the fission products are removed from the uranium and the plutonium in this process. Then, the aqueous phase 6 containing uranium and plutonium is transferred to the purification process. In the purification process, extraction using an organic phase as an extractor of TBP and inverse extraction using a thin nitric acid solution are repeated until purity of the uranium and plutonium reaches a necessary value. The aqueous phase 7 containing the uranium and plutonium purified as described above is transferred to the denitration/roasting-and-reduction process to be converted to a mixed oxide of uranium and plutonium to be formed to plutonium containing nuclear fuel.

Description will be made below on an effect in that part of an amount of uranium contained in the spent nuclear fuel is removed by making fluorine or a fluorochemical act on the spent nuclear fuel.

When 1 (one) ton of uranium is burned in a light water reactor, about 10 kg of plutonium and 920 kg to 950 kg of uranium are contained in spent nuclear fuel. When the spent nuclear fuel is dissolved, the nuclear fuel material including about 250 g of both of uranium and plutonium together can be dissolved in about 1 (one) litter of nitric acid. Therefore, a volume of liquid dissolving the above-mentioned amount of spent nuclear fuel is about 3700 litters. On the other hand, when part of an amount of uranium is removed through the fluoride volatilization method, an amount of uranium 4 times as much as 10 kg of plutonium is left in the remaining material. That is, an amount of remaining nuclear fuel material becomes 50 kg. Therein, when the nuclear fuel material including about 250 g of both of uranium and plutonium together is dissolved in 1 (one) litter of nitric acid, a volume of dissolution liquid in the case of removing part of an amount of uranium is only 200 litters. That is, by performing uranium separation through the fluoride volatilization method, the volume of dissolution liquid can be reduced to one-twentieth. On the other hand, in the crystallization method, uranium is removed after once dissolving the spent nuclear fuel to nitric acid. Therefore, the volume of dissolution liquid is not different from that in the Purex method. That is, the present embodiment has an effect in that the volume of nitric acid and the dissolution equipment used for dissolution become about 1/20 times as small as those of the conventional Purex method or the crystallization method. In addition, the present embodiment has an effect in that the volume of the processing solution and the size of the equipment used in the following process of the conventional Purex method or the single cycle method or the method of adding the purification process to the single cycle method also can be reduced nearly 1/20, and the reprocessing facility can be made substantially small.

Although in the present embodiment, an amount of uranium 4 times the amount of plutonium of 10 kg is left in the remaining material, an amount of uranium from equal part to 10 times the amount of plutonium of 10 kg may be left in the remaining material depending on a necessary ratio of plutonium to uranium to be described later. Even in the case where the amount of uranium 10 times the amount of plutonium of 10 kg is left, the volume of nitric acid and the size of the dissolution equipment, and the size of the equipment in the following process can be reduced to about 1/10.

One of major differences between the Purex method and the single cycle method is in whether or not the method has a distribution process for separating uranium from plutonium. The concentration of plutonium in nuclear fuel containing plutonium is higher than that in the spent light water fuel. The ratio of plutonium to uranium on the solution simply obtained by dissolving and co-decontaminating the spent light water fuel is smaller than a value necessary for the plutonium containing nuclear fuel. Therefore, it is necessary to remove part of an amount of uranium or to provide the distribution process for removing only plutonium. In the present method where uranium is separated by performing fluorination of the spent nuclear fuel before dissolving the spent nuclear fuel, by adjusting an amount of separated uranium so that the ratio of plutonium to uranium contained in the residue becomes a value equal to or slightly larger than the ratio in the product of plutonium containing fuel, the distribution process in the Purex method can be eliminated, and the more compact single cycle method or the method adding a purification process to the single cycle method can be employer. That is, there is an effect in that the reprocessing facility can be downsized by eliminating the distribution process in the Purex method, and amounts of used reagents and waste products can be reduced.

When part of an amount of uranium contained in the spent nuclear fuel is removed by making fluorine or a fluorochemical act on the spent nuclear fuel, the removed uranium is in a chemical form of $UF_6$. The boiling point of $UF_6$ is about 60° C., and the $UF_6$ gas can be changed to the solid or liquid phase using a cold trap. Further, the solid or liquid phase can be easily changed to the gas phase by reheating. The fission products having volatilization rates different from that of $UF_6$ can be separated from the uranium by using the cold trap and a rectification equipment. Furthermore, the fission products can be further removed from uranium by making the $UF_6$ in gas phase pass through an absorption trap filled with NaF and/or LiF and/or $MgF_2$. The DF reaches 100 millions to 1 billion which is equal to a DF attained by the co-decontamination and the uranium purification in the Purex method. On the other hand, in the case where part of an amount of uranium is separated by the crystallization method, an operation equivalent to the co-decontamination and the uranium purification in the Purex method must be performed in order to reuse the uranium in a light water reactor. In the case where plutonium of 10 kg and the amount of uranium 4 times the amount of plutonium are left in the spent nuclear fuel which contains 920 kg of uranium and 10 kg of plutonium, the amount of uranium removed from the spent nuclear fuel is 880 kg. When the uranium is dissolved in nitric acid, and then the co-decontamination and the uranium purification are performed, the volume of nitric acid solution supplied to the co-decontamination is about 3500 litters assuming that 250 g of uranium is contained in 1 (one) litter of the nitric acid solution. Further, nearly the same volume is required for each of the organic phase containing an extractor such as TBP and the aqueous phase for the inverse extraction. That is, the volume of the liquid used in the co-decontamination process is about 10000 litters, and nearly the same volume of liquid is used in the purification process. Since as the extraction machines used for the co-decontamination process and for the purification process, small-sized machines such as a centrifugal extracting machine have been developed, the size of these process facilities is determined by the volume of a tank storing the liquid used in the process. The capacities of these tanks are required to be 20000 litters for both of the co-decontamination and the purification processes to the case of 920 kg of uranium and 10 kg plutonium. If intermediate tanks are required, the required volume will become several times as large as that volume though it depends on the design. On the other hand, in the case of purifying $UF_6$, $UF_6$ in gas phase can be converted to solid or liquid phase. Uranium of 880 kg corresponds to 1300 kg of $UF_6$, and the specific density of $UF_6$ is 5.1 g/cc. Therefore, the stored volume is 250 litters. Even if a plurality of store tanks are installed, the total volume of the tanks will be 1000 to 2000 litters, and the installation scale will be smaller than 1/10 of a volume in the case of the purification of uranium separated through the crystallization method.

In the case where uranium separated through the crystallization method is used for blanket fuel of a fast breeder reactor, as the essential purpose of the invention described in Japanese Patent Application Laid-Open No.9-138279, the DF of the uranium is allowed to be low, and accordingly the operation equivalent to the co-decontamination and the uranium purification processes are unnecessary.

The recovered uranium contains about 1% of U-235, and the concentration of U-235 is enriched up to nearly 4% in order to use the uranium in a light water reactor. In the past, the enrichment is performed by converting uranium oxide obtained from the reprocessing facility into the chemical form of volatile $UF_6$, and then by increasing the concentration of U-235 through the centrifugal separation method or the like.

However, when part of an amount of uranium contained in the spent nuclear fuel is removed by making fluorine or a fluorochemical act on the spent nuclear fuel, the removed uranium is in the chemical form of $UF_6$. Therefore, the purified $UF_6$ can be directly transferred to a U-235 enriching facility. That is, the denitration/roasting-and-reduction process for the uranium nitrate solution in the reprocessing process and a conversion facility for converting uranium to $UF_6$ can be eliminated, and accordingly the cost required for reuse of the recovered uranium and the environmental load can be substantially reduced. Further, the enrichment cost is more economical than that in the case of using natural uranium having a U-235 concentration of 0.7% as the starting material.

As described above, according to the embodiment of the present invention, the following effects can be attained by removing part of an amount of uranium contained in the spent nuclear fuel is removed by making fluorine or a fluorochemical act on the spent nuclear fuel.

(1) Since the simple method using the absorbent such as NaF and distillation can be employed in order to make the DF of the separated UF6 above 10 millions, the storing volume of the liquid used for the purification process can be made small and accordingly the purification facility can be downsized. (2) Since in the case of reuse of light water reactor fuel, the denitration and the roasting-and-reduction facilities for the uranium nitrate solution in the reprocessing process and the conversion facility for converting uranium to $UF_6$ can be eliminated, the reprocessing facility can be made compact. (3) Since the single cycle method or the method of adding the purification process to the single cycle method without the distribution process can be used, the reprocessing facility can be downsized. (4) Since part of an amount of uranium is removed and then the residue is dissolved to be transferred to the extraction process, the volume of the processing solution and the size of the equipment used in the following process of the conventional Purex method or the single cycle method or the method of adding the purification process to the single cycle method can be made small and accordingly the reprocessing facility can be substantially downsized.

Embodiment 3

Figure 3:
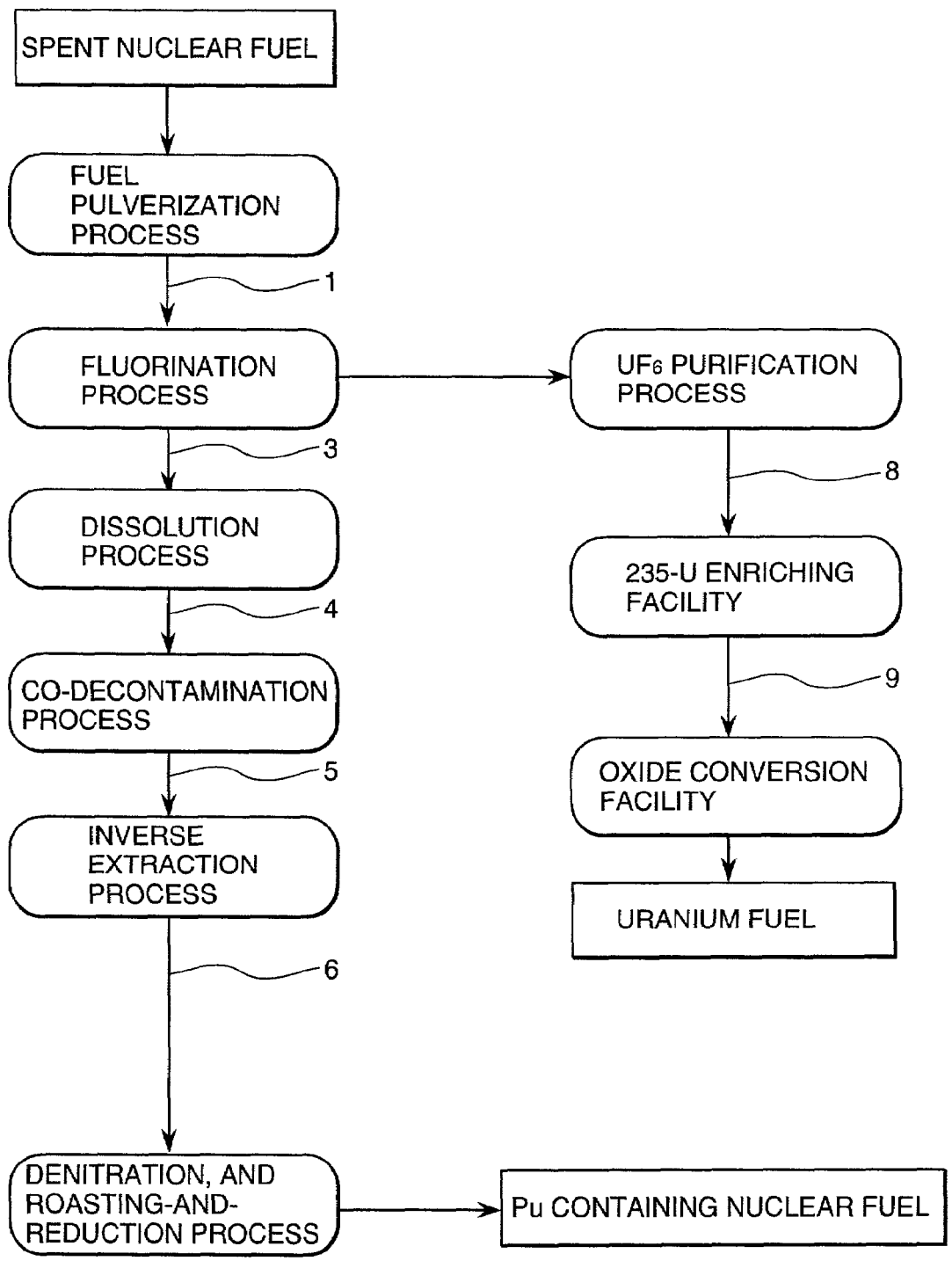
FIG. 3 is a diagram showing another embodiment of processing of a method of reprocessing spent nuclear fuel in accordance with the present invention.

Another embodiment of a method of reprocessing spent nuclear fuel in accordance with the present invention will be described below, referring to FIG. 3. The structure of FIG. 3 is an example in which the single cycle method is linked with the fluorination process for performing uranium separation, and the purification process is removed from the structure of FIG. 2. In the reprocessing method of this structure, the DF of the plutonium containing nuclear fuel is reduced compared to the reprocessing method of the structure of FIG. 2. In a case where the plutonium containing nuclear fuel is used for the core fuel of a fast breeder reactor, or in a case where plutonium containing nuclear fuel is used for a light water reactor acceptable of plutonium containing nuclear fuel having a low DF, the plutonium containing nuclear fuel having a low DF is allowable. Therefore, the structure of the present embodiment is effective. In this structure, there are the effects of Embodiment 2, and there are effect in that the reprocessing facility can be downsized by the amount of removing the purification process, and that the amounts of the reagent and the waste product can be reduced.

Embodiment 4

Figure 4:
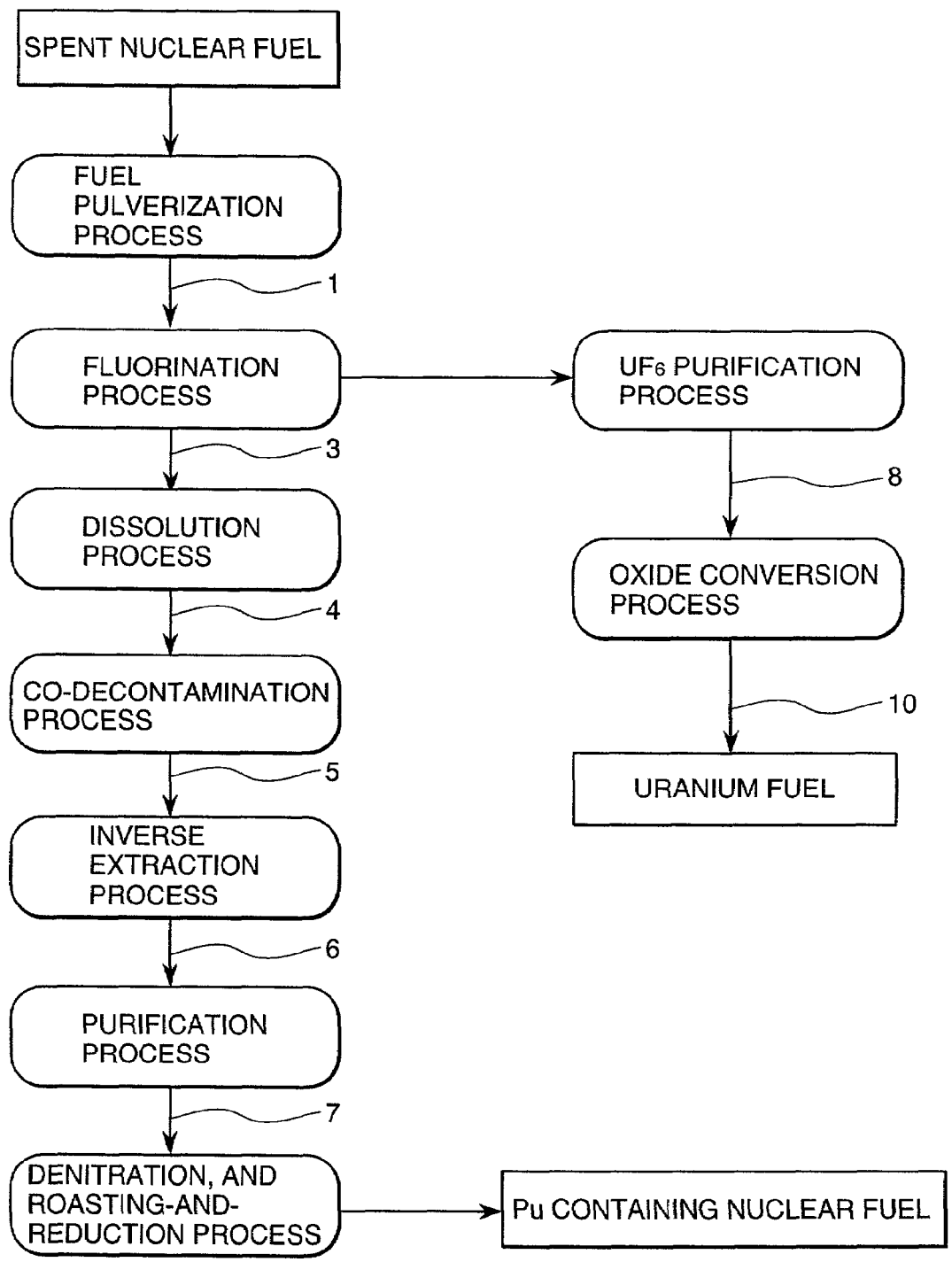
FIG. 4 is a diagram showing a further embodiment of processing of a method of reprocessing spent nuclear fuel in accordance with the present invention.

Another embodiment of a method of reprocessing spent nuclear fuel in accordance with the present invention will be described below, referring to FIG. 4. In Embodiment 2, the purified $UF_6$ of the product of the $UF_6$ purification process is transported to another facility of U-235 enriching facility. However, in the present embodiment, the purified $UF_6$ is directly converted to oxide without being enriched to produce uranium fuel. Since the fuel is low in U-235 concentration, the fuel is difficult to be burned in a light water reactor, but can be used as the blanket fuel in a fast breeder reactor. Further, since the blanket fuel of the fast breeder reactor may be acceptable even if the DF is low, the $UF_6$ purification process may be eliminated to send the unpurified $UF_6$ of the product of the fluorination process to the oxide conversion process. Among the effects of the present invention, the present embodiment has the following effects. That is, (3) since the single cycle method or the method of adding the purification process to the single cycle method without the distribution process can be used, the reprocessing facility can be downsized; and (4) since part of an amount of uranium is removed and then the residue is dissolved to be transferred to the extraction process, the volume of the processing solution and the size of the equipment used in the following process of the conventional Purex method or the single cycle method or the method of adding the purification process to the single cycle method can be made small and accordingly the reprocessing facility can be substantially downsized.

Figure 5:
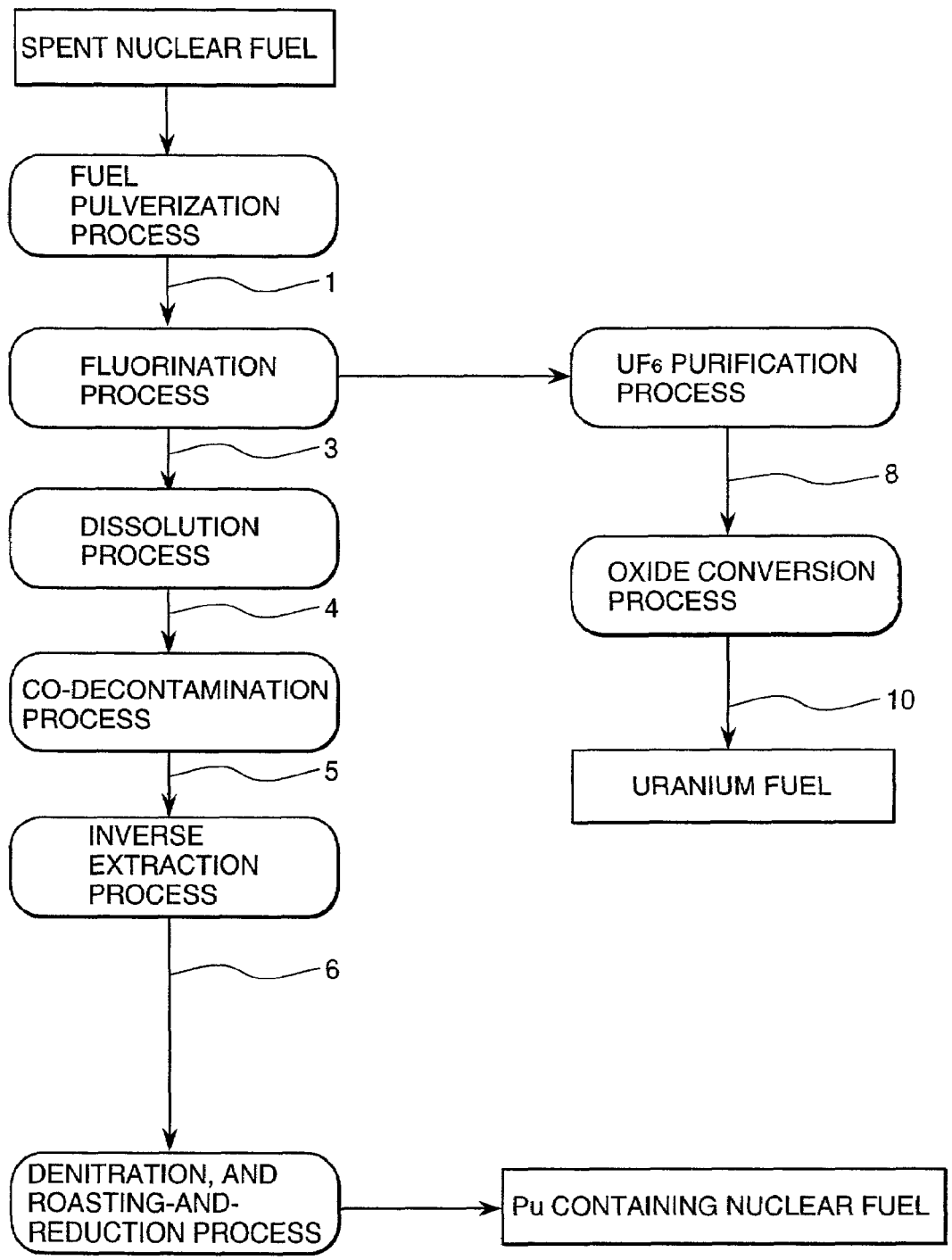
FIG. 5 is a diagram showing a still further embodiment of processing of a method of reprocessing spent nuclear fuel in accordance with the present invention.

Another embodiment of a method of reprocessing spent nuclear fuel in accordance with the present invention will be described below, referring to FIG. 5. The structure of FIG. 5 has a structure that in Embodiment 4 the purification process is eliminated. This embodiment is suitable for the case where the uranium fuel is used for the blanket fuel of the fast breeder reactor, and the plutonium containing fuel is used for the core fuel of the fast breeder reactor or for the fuel of a light water reactor acceptable of the plutonium containing nuclear fuel having a low DF. In addition to the effects of Embodiment 4, the structure of the present embodiment has an effect that the reproduction facility can be downsized by the amount of removing the purification process and accordingly the amount of the used reagents and the waste products can be reduced.

According to the present invention, the purity of uranium can be improved, and the reprocessing facility can be made compact.

What is claimed is:

1. A method of reprocessing spent nuclear fuel, comprising:
    vaporizing and removing part of an amount of uranium contained in the spent nuclear fuel, thereby to separate the part of the uranium amount from the spent nuclear fuel, by making fluorine or a fluorochemical act on the spent nuclear fuel, wherein an amount of uranium separation is adjusted so that a weight ratio of plutonium to uranium contained in remaining spent nuclear fuel that remains after said vaporizing and removing falls within a range of 1:1 to 1:10; and then
    performing solvent extraction of a mixture of uranium, plutonium and other nuclides contained in the remaining spent nuclear fuel to remove the other nuclides from the mixture.

2. A method of reprocessing spent nuclear fuel according to claim 1, wherein the uranium removed from the spent nuclear fuel by making fluorine or a fluorochemical act on the spent nuclear fuel is purified in a form of UF6.

3. A method of reprocessing spent nuclear fuel, comprising:
    removing part of an amount of uranium contained in the spent nuclear fuel, thereby to separate the part of the uranium amount from the spent nuclear fuel, by making fluorine or a fluorochemical act on the spent nuclear fuel, wherein an amount of uranium separation is adjusted so that a weight ratio of plutonium to uranium contained in remaining spent nuclear fuel that remains after removing the part of the uranium amount falls within a range of 1:1 to 1:10;
    extracting for transferring plutonium and uranium to an organic solvent by making the organic solvent act on an aqueous liquid containing the remaining spent nuclear fuel obtained from said spent nuclear fuel; and
    inverse extracting for transferring said plutonium and uranium from said organic solvent to an aqueous liquid.

4. A method of reprocessing spent nuclear fuel according to claim 3, wherein said removing part of an amount of uranium contained in the spent nuclear fuel is performed before a process for dissolving the remaining spent nuclear fuel.

5. A method of reprocessing spent nuclear fuel according to claim 3, wherein the uranium removed from the spent nuclear fuel by making fluorine or a fluorochemical act on the spent nuclear fuel is purified in a form of UF6.

6. A method of reprocessing spent nuclear fuel, comprising
    vaporizing and removing part of an amount of uranium contained in the spent nuclear fuel thereby to adjust a weight ratio of uranium to plutonium, by making fluorine or fluorochemical act on spent nuclear fuel; and then
    solvent extracting a mixture of uranium, plutonium and other nuclides contained in a remainder of the spent nuclear fuel after the vaporizing and removing of the part of the uranium amount to remove said other nuclides from said mixture, thereby to separate uranium and plutonium from said other nuclides.

7. A method of reprocessing spent nuclear fuel, comprising
    removing part of an amount of uranium contained in the spent nuclear fuel thereby to adjust a weight ratio of uranium to plutonium so that a part of the uranium amount remains in the spent nuclear fuel, by making fluorine or a fluorochemical act on the spent nuclear fuel;
    extracting for transferring plutonium and uranium to an organic solvent by making the organic solvent act on an aqueous liquid containing a nuclear fuel material obtained from said spent nuclear fuel from which the part of the uranium amount is removed; and
    inverse extracting for transferring said plutonium and uranium from said organic solvent to an aqueous liquid.

* * * * *